United States Patent [19]

Fruhauf et al.

[11] Patent Number: 4,952,796

[45] Date of Patent: Aug. 28, 1990

[54] LIGHT DETECTION CIRCUIT HAVING A JUNCTION REVERSE-BIASED BY A CURRENT GENERATOR

[75] Inventors: Serge Fruhauf, Peynier; Laurent Sourgen, Aix en Provence, both of France

[73] Assignee: SGS-Thomson Microeleronics SA, Gentilly, France

[21] Appl. No.: 235,365

[22] Filed: Aug. 23, 1988

[30] Foreign Application Priority Data

Aug. 31, 1987 [FR] France .............................. 87 12069

[51] Int. Cl.$^5$ .............................................. H01V 40/14
[52] U.S. Cl. .................................. 250/214 R; 307/311
[58] Field of Search ........ 250/214 A, 214 R, 214 RC, 250/214 P, 214 C, 209, 211 J, 578, 208.2; 307/297, 311; 330/288, 308

[56] References Cited

U.S. PATENT DOCUMENTS

| | | | |
|---|---|---|---|
| 3,993,569 | 11/1976 | Zinsmeyer et al. | 250/214 R |
| 4,085,411 | 4/1978 | Genesi | 250/214 P |
| 4,282,429 | 8/1981 | Galbraith | 250/214 RC |
| 4,454,416 | 6/1984 | Gontowski, Jr. et al. | 250/214 A |

FOREIGN PATENT DOCUMENTS 2130399 11/1972 France .
2346697 10/1977 France .
2370268 2/1978 France .

Primary Examiner—David C. Nelms
Attorney, Agent, or Firm—Roland Plottel

[57] ABSTRACT

In a semi-conducting integrated circuit, there is made a light detection circuit, the output signal of which can be used to counter manipulations by dishonest persons who undertake a decapsulation or a removal from the card when the integrated circuit is inserted in a bank type card, or even a depassivation of the upper protective layer of this integrated circuit, in order to reveal the secret functioning of the circuit or to modify its characteristics. The detector comprises a current generator delivering a current of limited intensity which flows into a reversed biased electronic junction. When the junction is subjected to light, the reverse current that can be allowed into the junction increases. Since the current generator is not capable of putting through stronger current, the voltage at the terminals of the junction drops. This drop in voltage is used as information that reveals the illumination.

7 Claims, 2 Drawing Sheets

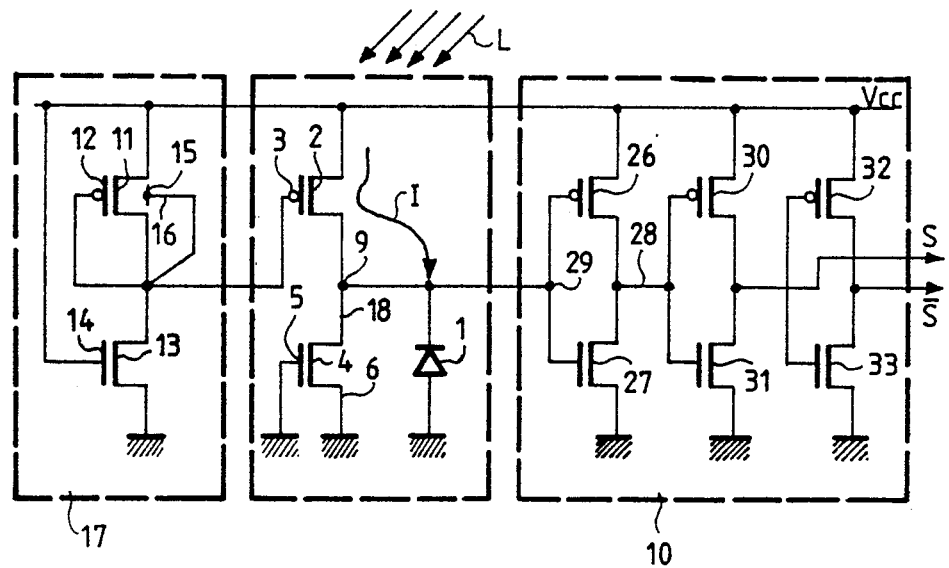
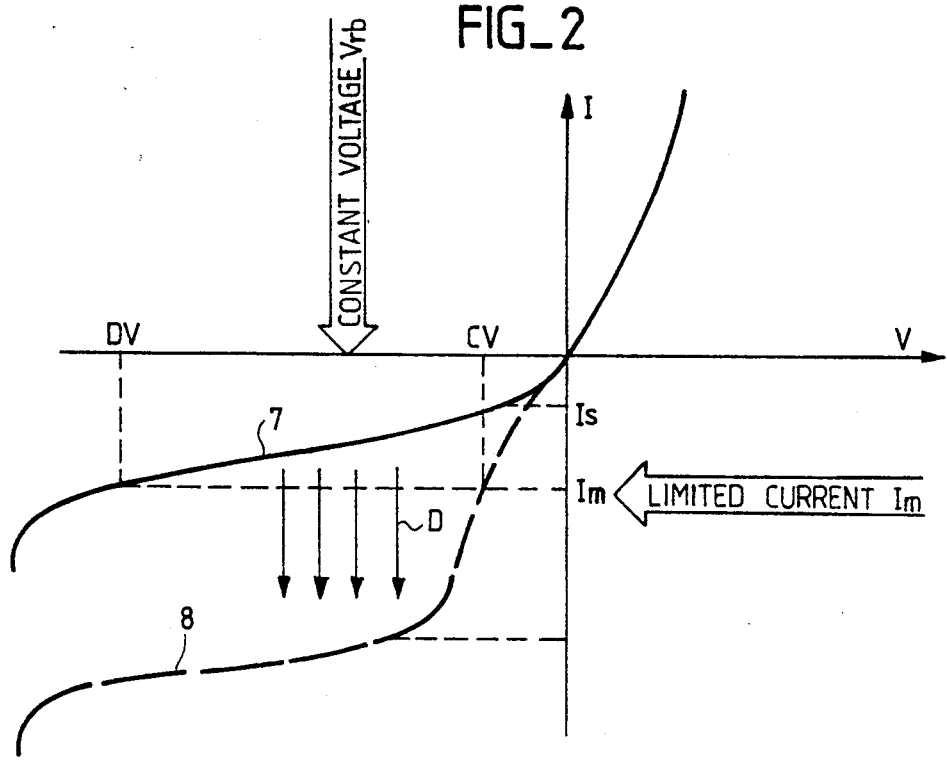

FIG_3
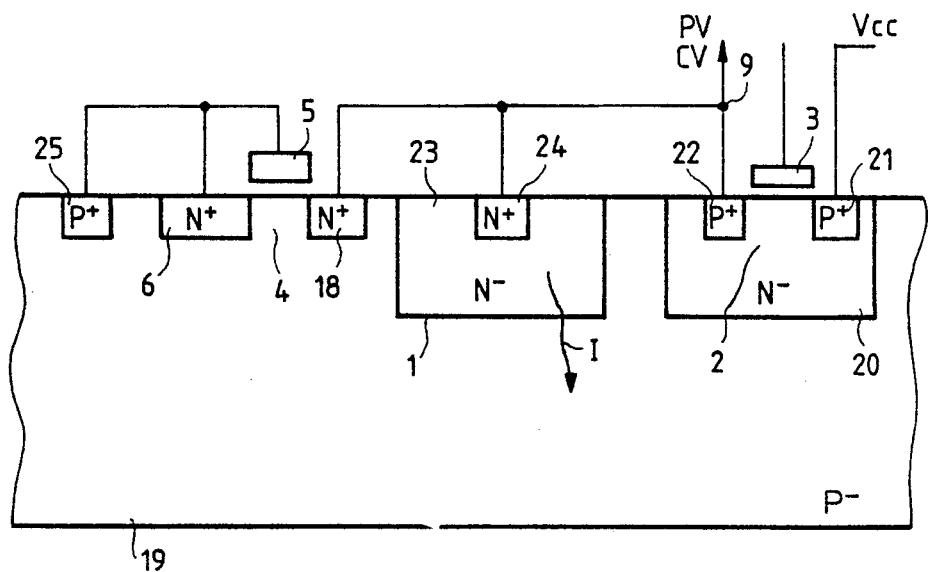

LIGHT DETECTION CIRCUIT HAVING A JUNCTION REVERSE-BIASED BY A CURRENT GENERATOR

BACKGROUND OF THE INVENTION

1. Field of the Invention

An object of the invention is a light detection circuit which can be used to detect the appearance of an illumination. This circuit can be used preferably in the field of electronic integrated circuits where, if it is integrated into the same substrate as an integrated circuit to be protected, it can take into account an illumination to which this circuit would be subjected.

2. Description of the Prior Art

Certain electronic integrated circuits are confidential in character, either because the information that they memorize should remain secret or because their operation must remain concealed. The latter case generally comes up when it sought to prevent forgeries or else, especially with memory card, to prevent the reconstitution of secret algorithms. For, it has been realized that the operation of an integrated circuit can be known and understood by deduction when the passivation layer which covers this circuit at the end of its manufacture has been removed. To this end a selection is made, after depassivation, of the functions of the circuit while observing the flow of current in the connections of this circuit with an electron microscope. The flow of current causes localized mechanical constraints in semi-conducting parts. From this, functional information can be deduced about the integrated circuit.

In memory cards, the integrated circuits used are generally of the non-volatile type, the memory cell of which comprises a floating gate transistor. Some of them are programmable and erasable through the subjecting of the chip to ultraviolet radiation. This radiation is spectrally located outside the visible band. At the end of the manufacture of these circuits, the chips are covered with a transparent passivation layer by which, after a prior operation to test the proper working of the integrated circuit, the recorded test information is erased and the memory is returned to the state of a virgin memory for use as desired by the purchaser. As soon as this testing operation is completed, the integrated circuits which have thus been passivated are buried in opaque holding supports. In memory cards, especially of the bank card type, this opaque support may consist of the plastic material of the card itself. The problem to be resolved consists in preventing a dishonest person from removing the semi-conducting chip from the card after it has been programmed by the user, in order to examine it with an electron microscope in an attempt to deduce its operation therefrom or at least to neutralize its access codes.

Certain integrated circuits, especially those comprising electrically erasable memories or memories designed to be programmed only once, comprise opaque passivation layers. For these circuits, through measurement of the illumination, it is ultimately the depassivation operation that it is sought to control.

SUMMARY OF THE INVENTION

It is an object of the invention to detect and to neutralize, if necessary, the exposure of circuits of this type to light. In working towards this end, it has been realized that the junctions of diodes or of reverse biased drain-channel regions of the transistor react differently to light. For, light increases the leakage current of reverse biased junctions by a factor of about 1000. The invention is thus based upon this principle, accentuating it to the maximum extent. In this way, a detector sensitive to direct or ambient light is made.

An object of the invention, therefore, is a light detection circuit comprising a junction that is reverse biased by a current generator.

BRIEF DESCRIPTION OF THE DRAWINGS

The invention will be better understood from the following description and the accompanying figures, which are given purely by way of indication and in no way restrict the scope of the invention. Of these figures:

FIG. 1 shows a light detection circuit according to the invention;

FIG. 2 is a voltage/current graph showing the development of the characteristic curve of a junction subjected to an illumination;

FIG. 3 shows a schematic view of a simple example of a detector according to the invention integrated into a substrate of an electronic integrated circuit to be protected.

DESCRIPTION OF A PREFERRED EMBODIMENT

FIG. 1 shows a light detection circuit according to the invention. This circuit essentially has a junction contained in a diode 1 reverse biased by a current generator 2. In a preferred example, the current generator consists of a transistor 2 kept at the conduction limit by a control voltage applied to its gate 3 by a control circuit 17. To ensure its accurate biasing, the transistor 2 is series mounted between a power supply Vcc and an off transistor 4. In the example shown, the transistor 2 is a P channel transistor and the transistor 4 is an N channel transistor. The transistor 4 is turned off by the connection of its gate 5 with the same ground potential as its drain 6. This detector works as follows. When the junction 1 is not subjected to illumination, its characteristic voltage/current curve V-I is the curve 7 of FIG. 2. The third quadrant of the characteristic curve of this junction is used since the junction is reverse biased. The transistor 2, driven at the conduction limit, is capable only of delivering a current Im. However, this current Im is greater than a reverse saturation current Is in the junction 1. Thus, this junction is subjected to a potential difference DV substantially equal to the supply voltage Vcc minus the drain-source voltage drop in the transistor 2.

When the junction 1 is subjected to illumination indicated by the arrows L, the characteristic curve 7 is shifted to 8, indicated by the arrows D. This means that the reverse saturation current becomes far greater. In practice, it even becomes about 1000 times greater although the drawing does not show it. Thus the transistor 2, which is capable of delivering only a current Im of limited intensity since it is at the conduction limit, imposes a new drop in voltage CV at the terminals of the junction 1. In practice, from one state of illumination to another, the current Im is not quite constant. However, this approximation is warrranted by the very great variation in the saturation current of the junction. The result of this is that, due to the illumination, the potential at a mid-point 9 between the transistors 2 and 4, to which the junction 1 is connected, undergoes a drop equal to (DV−CV). This potential drop is used in a re-shaping and using circuit 10 as an illumination detection signal.

In one example, the biasing circuit 17 of the current generator formed by the transistor 2 comprises two transistors in series and in conducting state. The first transistor 11 is, for example, a P channel transistor with its source connected to the voltage supply Vcc and its drain connected to the gate 3 of the transistor 2. The gate 12 of the P channel transistor 11 is also connected to the gate 3. The second transistor 13 is an N channel transistor with its drain connected to the gate 3 and its source connected to the ground. The gate 14 of the transistor 13 is connected to the power supply Vcc. In view of the polarities of these transistors, this connection mode makes them both conductive. They constitute a divider bridge through their series-mounted conduction resistors.

In a preferred conduction embodiment, a semi-conducting substrate used to make an integrated circuit is a P type semi-conducting substrate. The P channel transistor 11 should then be made therein in an N- doped pad 15. To eliminate a so-called substrate effect, the pad 15 of the transistor 11 is connected by means of a pad connector 16 to the source of this transistor 11. The voltage available at the gate 3 of the transistor 2 depends on the respective sizes of the transistors 11 and 13. In practice, the transistor 11 is far bigger than the transistor 13 so that its conduction resistance is much weaker than the conduction resistance of the transistor 13. In this way, the voltage at the gate 3 is substantially equal to Vcc−Vds. The value Vds represents the voltage drop in the transistor 2 when it is conductive. The transistor 2 is always conductive. It behaves like a substantially constant current generator. Thus, when the junction 1 is subjected to illumination, it is incapable of providing sufficient current to saturate this junction in reverse. This junction causes only a small drop in potential CV.

When the junction 1 is subjected to illumination, the transistor 4, which is an N channel transistor, has an N+P− diode between its drain region 18 and the substrate 19 of the semi-conducting integrated circuit (FIG. 3). This diode 18-19 is also reverse biased. It therefore shows the same type of modification of its reverse voltage/current characteristic when it is subjected to illumination. In practice, only one of these junctions, the diode 1 or the junction 18-19 of the transistor 4, is used. As a matter of fact, it is the junction for which the reverse voltage-current characteristic undergoes the greatest shift as a function of light that imposes the corresponding shift in the voltage available at the mid-point of the assembly. In other words, one of the two junctions is unnecessary from this point of view. Nonetheless, this dual aspect of the embodiment has made it possible (and this can be verified by calculation) to show that, among those junctions which show greater sensitivity to light, it is those wherein the concentrations of impurities on either side of the junction are the lowest that are, at the same time, the most efficient ones. Thus, an N+P− or N−P+ type of junction will be less efficient than an N−P− type of junction.

FIG. 3 shows a schematic sectional view of the assembly of the detector according to the invention. On a P− semi-conducting substrate 19, there is made a pad 20, with an concentration of N− impurities, said pad 20 containing the transistor 2 of the current generator. The source 21 of the transistor 2 is connected to the power supply Vcc. The gate 3 of the transistor 2 is connected to the control circuit 17, and the drain 22 of the transistor 2 is connected, firstly, to the drain 18 of the transistor 4 and, secondly, to the cathode 23 of the diode 1. In practice, this diode 1 can be made in the same way and at the same time as the pad 20. It has a concentration N− of impurities in its cathode region, its anode being formed by the P− doped substrate itself. To improve the connection, an N+ doped pad connector 24 may even be made if a subsequent stage in the method permits it. In the same way, the connection of the substrate and the source 6 of the transistor 4 to the ground can be got by making a substrate connector 25. Depending on which of the junctions, 1 or 18-19, has preponderant efficiency, the other junction can be omitted.

In a preferred embodiment, the re-shaping circuit 10 (FIG. 1) comprises at least two inverters. Preferably, it even has three of them so as to deliver a signal with a given polarity and a complementary signal when an illumination is detected. The first inverter, which has a P channel transistor 26 in series with an N channel transistor 27 between the power supply and the ground, is preferably de-symmetrized so as to easily deliver a high level at its output 28 when it receives a low level at its input 29, i.e. when there is an illumination (CV). An object of this disymmetry is to reduce current current in the inverter during operation in permanent mode. Another object of this disymmetry is to increase sensitivity to flipping over of the inverter when the illumination is applied. For, the voltage CV available at the terminals of the junction 1 is not strictly zero. Thus, to prevent this non-zero voltage from causing the inverter 26-27 to flip over, this inverter is de-symmetrized so that it is no longer sensitive. The second inverter, built on the same principle, has two transistors 30-31. It is cascade mounted with the inverter 26-27. It is a standard inverter and, ultimately, it acts as a signal amplifier. This inverter gives a signal S representing the illumination. Preferably, the inverter 30-31 is itself cascade-mounted with a third inverter 32-23 to deliver a signal S complementary to the signal S. One of these two signals can be used to neutralize the use of a semiconducting integrated circuit when it is desired to protect it against attempts resulting from separation from the card or from depassivation.

We claim:

1. A light detection circuit comprising a junction that is to receive light to be detected, said junction being reverse biased by a current generator, wherein said current generator comprises a transistor biased at said transistor conduction limit to deliver a current of limited intensity to said junction, whereby the voltage across said junction varies according to light intensity.

2. A circuit according to claim 1 wherein the junction is contained in a diode.

3. A circuit according to claim 1 wherein the junction is contained in a transistor.

4. A circuit according to any of the claims 1 or 3, integrated in a semi-conducting substrate of an electronic integrated circuit to protect said electronic integrated circuit from exposure to light.

5. A circuit according to any of the claims 1 to 3 wherein the junction is of the N−P−type.

6. A circuit according to claim 5 wherein the N−P− junction is formed by an N− pad in a P− semi-conducting substrate.

7. A circuit according to any of the claims 1 to 3, comprising a re-shaping circuit comprising at least two bi-stable inverters in series, a first disymetrical bi-stable inverter with an input connected to a terminal of the junction, to detect by flip-over, an exposure of said light detection circuit to light, and a second inverter with an input connected to an output of the first inverter, to amplify the flip-over signal given by the first inverter.

* * * * *